United States Patent
Leung et al.

(10) Patent No.: US 10,737,229 B2
(45) Date of Patent: Aug. 11, 2020

(54) METHOD FOR DESIGNING MULTI-VALVE UNI-DIRECTION BLOWDOWN SYSTEM FOR A HIGH PRESSURE TUBULAR REACTOR

(71) Applicant: NOVA Chemicals (International) S.A., Fribourg (CH)

(72) Inventors: Teresa Yuk Woon Leung, Calgary (CA); Kamal Kamel Botros, Calgary (CA); Ross Donald Moreton, Sarnia (CA); Benjamin Milton Shaw, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 91 days.

(21) Appl. No.: 15/776,830

(22) PCT Filed: Dec. 2, 2016

(86) PCT No.: PCT/IB2016/057326
§ 371 (c)(1),
(2) Date: May 17, 2018

(87) PCT Pub. No.: WO2017/098389
PCT Pub. Date: Jun. 15, 2017

(65) Prior Publication Data
US 2018/0345238 A1    Dec. 6, 2018

Related U.S. Application Data

(60) Provisional application No. 62/264,508, filed on Dec. 8, 2015.

(51) Int. Cl.
*C08F 2/00* (2006.01)
*C08F 2/01* (2006.01)
(Continued)

(52) U.S. Cl.
CPC ............... *B01J 3/02* (2013.01); *B01J 4/007* (2013.01); *B01J 4/008* (2013.01); *B01J 12/02* (2013.01);
(Continued)

(58) Field of Classification Search
CPC ........................................................ C08F 2/01
(Continued)

(56) References Cited

U.S. PATENT DOCUMENTS 3,306,889 A * 2/1967 Schappert ............... C08F 10/00
526/68
3,628,918 A    12/1971 Beals et al.
(Continued)

FOREIGN PATENT DOCUMENTS

WO    2014/046835 A1    3/2014
WO    2015/166297 A1    11/2015

*Primary Examiner* — Rip A Lee
(74) *Attorney, Agent, or Firm* — Gary F. Matz

(57) ABSTRACT

Provided herein is a unidirectional blow down system for a high-pressure tubular reactor with a hyper that minimizes the tube wall metal temperature during a decomposition event wherein the system prevents the reactor walls from reaching a temperature capable of causing the tube metal to austenize. Also provided are methods of designing and methods of operating a unidirectional blowdown system.

25 Claims, 5 Drawing Sheets

(51) Int. Cl.
   *B01J 3/02* (2006.01)
   *B01J 19/24* (2006.01)
   *B01J 4/00* (2006.01)
   *B01J 12/02* (2006.01)

(52) U.S. Cl.
   CPC ............ *B01J 19/2415* (2013.01); *C08F 2/01* (2013.01); *B01J 2204/005* (2013.01); *B01J 2204/007* (2013.01); *B01J 2219/0027* (2013.01); *B01J 2219/00051* (2013.01); *B01J 2219/00081* (2013.01); *B01J 2219/00162* (2013.01); *B01J 2219/00166* (2013.01); *B01J 2219/00245* (2013.01)

(58) Field of Classification Search
   USPC ...................................................... 526/59, 64
   See application file for complete search history.

(56) References Cited

U.S. PATENT DOCUMENTS

| | | | | |
|---|---|---|---|---|
| 3,812,090 | A * | 5/1974 | Brugge | B01J 12/00 526/64 |
| 4,046,718 | A * | 9/1977 | Mass | B01J 19/2425 526/64 |
| 4,135,044 | A * | 1/1979 | Beals | C08F 110/02 526/352.2 |
| 4,175,169 | A | 11/1979 | Beals et al. | |
| 4,804,725 | A * | 2/1989 | Kanne | B01J 19/002 526/68 |
| 7,192,561 | B2 * | 3/2007 | Groos | G05D 16/2013 422/112 |
| 9,908,950 | B2 * | 3/2018 | Wolfram | B01J 19/0006 |
| 2002/0071798 | A1 | 6/2002 | DeCourcy et al. | |
| 2003/0206835 | A1 | 11/2003 | Donck | |
| 2011/0287204 | A1 | 11/2011 | Devisme et al. | |
| 2013/0274424 | A1 * | 10/2013 | Weiand | C08F 10/02 526/64 |

* cited by examiner

Example of Conventional Multi-valve Design

Example of 1-valve Design

Examples of Proposed Design

EBD: Emergency Blowdown Valve
DV: Dump Valve
LDV: Let-down Valve
Hyper: Hyper Compressor

METHOD FOR DESIGNING MULTI-VALVE UNI-DIRECTION BLOWDOWN SYSTEM FOR A HIGH PRESSURE TUBULAR REACTOR

The present disclosure relates to a unidirectional blow down system for a high-pressure tubular reactor with a hyper that minimizes the tube wall metal temperature during a decomposition event wherein the system prevents the reactor walls from reaching a temperature capable of causing the tube metal to austenize. Also provided are methods of designing and methods of operating a unidirectional blowdown system LDPE tubular reactors all have some arrangement of safety systems for relieving the reactor pressure when an ethylene decomposition event (herein after referred to as a "decomp") occurs. One example of an existing system has two blowdown valves located at the front and the back end of the reactor, respectively, which vent the contents of the reactor once a decomp is detected. In this design the hypercompressor (herein after referred to as a "hyper") continues to run while both valves are open until the internal pressure reaches half of the maximum design pressure value, at which time one valve is closed. A control logic is in place to determine which of the valves to close based upon the starting location of the decomp within the reactor in order to push the flow out of the reactor most quickly. The blowdown system is designed such that the time to vent down to half pressure is in the order of 1 second.

Other example systems use two valves, or more, to accomplish venting in a similar time frame. The goal of these multi-valve blowdown systems is to drive the decomp out of the reactor as quickly as possible. In these systems keeping the depressurization time on the order of 1 to 2 seconds to half of the maximum design pressure is claimed to be key to their success. The most adverse effect of decomp is the excessively high temperatures that can damage the reactor tubes. Therefore, rapid removal of the hot gas produced by decomp is believed to be essential during emergency blowdown. It is hypothesized that high flow velocities minimize the exposure time of the tube wall metal to the decomposing ethylene. The rapid depressurization within the reactor is also believed to reduce the intensity of the decomp reactions as well as the density of the ethylene and therefore the amount of heat transfer from the fluid to the tube wall. One of the disadvantages to these designs are the inevitable stagnant flow regions that occur within the reactor during blowdown as two or more valves are open simultaneously.

As an alternative to designs using multiple valves, some manufacturers use one valve at the back end of the reactor. The intent of such single valve systems is to maintain the flow in a single direction to avoid stagnation and/or stalling of the reacting materials in any reaction zone. A valve upstream of the hyper is closed to isolate the flow at the suction side. These one-valve systems have longer depressurization time at the front end of the reactor than multi-valve systems, though they are still within acceptable limits.

In an embodiment provided herein is a unidirectional blow down system for a high-pressure tubular reactor with a hyper that minimizes the tube wall metal temperature during a decomposition event comprising a front Emergency Blowdown (herein after referred to as a "EBD") valve located downstream from the hyper discharge and at the front end of the reactor; and at least one additional valve at the end of the reactor; wherein the system prevents the reactor walls from reaching a temperature capable of causing the tube metal to austenize by maintaining flow in a single direction away from the hyper during the blowdown process, and by maintaining specific pressure and flow velocity within the reactor during blowdown so that the amount of heat transfer to the tube reactor is minimized.

In another embodiment provided herein is method for implementing a unidirection blow down of a decomp in a tube reactor with a hyper that minimizes the tube wall metal temperature during a decomposition event comprising a) sensing the decomp event; and b) delivering automated signals to initiate the opening of a front EBD valve located downstream from the hyper discharge and the opening of at least one additional valve at the end of the reactor; wherein the system prevents the reactor walls from reaching a temperature capable of causing the tube metal to austenize by maintaining flow in a single direction away from the hyper during the blowdown process, and by maintaining specific pressure and flow velocity within the reactor during blowdown so that the amount of heat transfer to the tube reactor is minimized.

In another embodiment provided herein is a method for designing blow down system for a tube reactor comprising a) determining the austenization temperature for the tube metal; b) optimizing the blow down system based on the reduction of the amount of heat being transferred to the tube wall during blowdown to eliminate austenization of the tube metal during the decomp event instead of optimizing the system to depressurize as quickly as possible.

Figure 1:
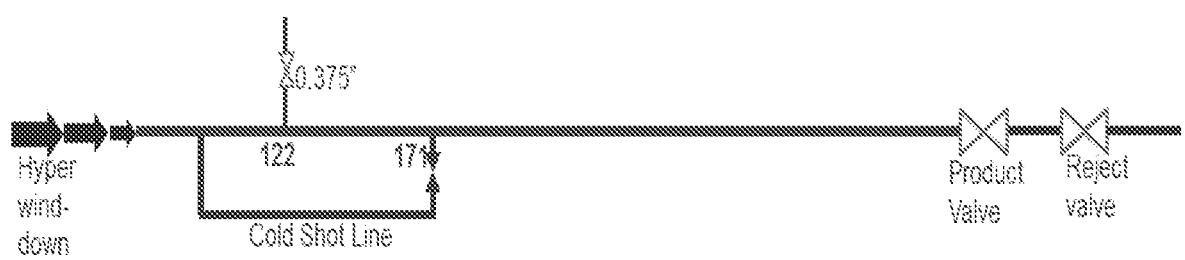
FIG. 1: Schematic of a proposed blowdown system design

An example of an undesirable microstructure for the LDPE reactor tubes is martensite: it is the hardest and most brittle of the various microstructures found in carbon steels. Martensite forms when the tube wall is heated up past a certain temperature at which the metal begins to form austenite. Since decomp temperatures can be excessively high (>1000 C.), it is possible to heat the tube wall above the austenization temperature. Once austenized, if the material is cooled rapidly, the microstructure will transform from austenite to martensite. During emergency blowdown in most tubular reactors, due to the nature of the decomp reactions, the tube wall cools rapidly after a decomp wave has passed by. The rate of cooling of the tube wall cannot be controlled easily, which can lead to the formation of martensite. Any reactor tube containing martensite should be replaced because its mechanical properties are compromised.

One way to prevent martensite formation is to prevent the tube wall from being austenized in the first place. The maximum allowable temperature any tube wall is exposed to should be less than the temperature at which austenization occurs for that specific tube wall material. The austenization temperature is a function of the tube metal chemical composition and heating rate and can be determined either from a lab experiment (e.g. dilatometry) or from historical plant data gathered from past decomp event(s) that led to the formation of martensite. If neither historical plant data nor dilatometry results are available, estimates for austenization temperatures can be taken from the literature associated with the specific chemical composition of the metal used to make the reactor tubes.

Described herein is a method for designing blowdown systems for a reactor, for example, a tubular LDPE reactor, that is based on the metallurgy of the reactor tubes. In order to avoid transformation of the reactor tube material, it is necessary to manipulate the process conditions inside the reactor during blowdown. Pressure, velocity and temperature of the reacting mixture inside the reactor contribute to the amount of heat transfer to the reactor tube and the resulting degree of damage to the tube metal. Most LDPE operators have developed "proxy" design criteria with regards to the pressure and velocity such as minimum allowable velocity and maximum depressurization time at a certain location. One potential problem with using proxy design criteria is that the design process necessarily relies on the specific reactor configuration and cannot therefore be applied more universally to other reactors. In addition these methods do not determine the limit at which a reactor tube becomes compromised leaving room for further optimization in the design process.

In one embodiment this invention provides a methodology to determine the maximum reactor tube internal surface temperature during a decomp event to prevent austenization of the tube metal. In another embodiment this invention provides a methodology to determine the maximum reactor tube internal surface temperature reached during a decomp event to predict whether austenization has taken place to the tube metal. This methodology can be applied to both actual decomp events, to assess if any reactor tube had been compromised, and to simulated decomp events, to test whether new process conditions or reactor configuration would lead to reactor tubes being compromised.

This methodology consists of 4 steps. Software written in, for example FORTRAN and PYTHON, though any programming language would work, can be developed to perform such calculation.

Step 1: Dynamic Modeling of Blowdown

The pressure and velocity fields inside the reactor during blowdown are first modeled using a dynamic model. Any model that solves for the governing equations based on first principles, namely conservation of mass, momentum, energy and equation of state, and can predict the pressure and velocity fields inside a reactor during a blowdown event would suffice. Commercially available software that have flow dynamics capability (e.g. HYSYS Dynamics, Aspen Plus and Flowmaster) can be used, but any other commercial or in-house solver that can model the velocity and pressure fields for unsteady compressible flow would suffice. The model should include all regions within the reactor with well-defined inflow and outflow boundary conditions. In a LDPE tubular reactor, the start of the reactor is typically the hyper discharge and the end of the reactor is where a let-down valve is located through which the ethylene/polymer mixture leaves the reactor and enters a high-pressure product separator. All related elements, which typically comprise of hypercompressor interstage coolers, preheater tubes, side streams/cold shot lines, all reactor zones, and product cooler if exist, should be included in the model. Either pressure or mass flow boundary condition has to be provided for each inlet and outlet present in the reactor. If a valve is present at the flow boundary, (e.g. blowdown valve, let-down valve, bypass valve, block valve, control valve or three-way valve), its valve characteristics should be included in the model.

Step 2: Tracking a Decomp Through Time

To model a past event, if temperature measurements with good time resolution and accuracy are available, the temperature measurement for a reactor tube in question can be used directly as an input to the model. If measurement is of low quality or unavailable, or the interest is to simulate a hypothetical event for prediction purposes, a temperature profile can be generated using a decomp wave tracking tool. For a given location inside the reactor where the decomp initially starts, and the corresponding local process conditions, which are the pressure, temperature and polymer content, this model simulates how the decomp wave would propagate within the reactor during a blowdown event. This tracking tool has three components: 1) a thermodynamics or chemical kinetics model that predicts the decomp temperature at given local process conditions; 2) a decomp wave propagation model that is empirically developed based on plant data; and 3) cooling of the reacted gas behind the decomp waves due to the cooling jacket wrapped externally around the reactor tube Step 3: Determine the Heat Transfer Coefficient at the Tube Bore The heat transfer coefficient is a function of pressure, temperature and velocity at any given location within the reactor. The pressure and velocity are obtained from Step 1 and temperature is obtained from Step 2. In one preferred embodiment the heat transfer coefficient is calibrated specifically for a given reactor. Alternatively a generic formulation can also be used if plant data is not available.

Step 4. Perform Transient Heat Transfer Modeling to Determine Tube Wall Temperature Profile For any tube in question, and at any point along the length of the tube, its temporal profiles of pressure, velocity, temperature, and heat transfer coefficient during a blowdown event can be used to determine the tube wall temperature profile by solving the 1D transient heat equation using any suitable numerical method such as the finite-difference method. The internal (tube bore) boundary conditions are fully specified with the temporal profiles of pressure, velocity, temperature, and heat transfer coefficient of the flow inside the reactor. The external boundary conditions are fully specified by the temperature, pressure and flow rate of the cooling water jacket. The resulting metal temperature profile will indicate whether any microstructural transformation has occurred in the metal. The transformation temperature should be known a priori as discussed above.

Applying the methodology as outlined above, a blowdown system can be designed for a reactor that minimizes the transfer of heat to the tube walls keeping the temperature of the tube metal below the austenization temperature of the metal. A schematic of one proposed design is shown in FIG. 1.

Provided herein is a unidirectional blow down system for a tube reactor with a hyper that minimizes the tube wall metal temperature during a decomposition event comprising a front emergency blowdown valve located downstream from the hyper discharge; at least one additional valve at the end of the reactor; wherein the system prevents the reactor walls from reaching a temperature capable of causing the tube metal to austenize by maintaining flow in a single direction away from the hyper during the blowdown process, and by maintaining specific pressure and velocity fields within the reactor during blowdown so that the amount of heat transfer to the reactor tubes is minimized.

In one embodiment the front emergency valve is smaller than the valve at the end of the reactor. In one embodiment the front emergency valve has an inner diameter (ID) of from about 0.25 to about 0.5 inches. In another embodiment, the front emergency valve has an ID of from about 0.3 to about 0.4 inches. In another embodiment the front emergency valve has an ID of 0.375 inches.

In one embodiment the valve ID at the end of the reactor is from about 0.375 to about 2 inches. In another embodiment the valve ID at the end of the reactor is from about 1 to about 1.5 inches. In another embodiment valve ID at the end of the reactor is about 1 inch.

The valve locations and sizes are provided by way of example only. The modeling systems may predict other sizes or locations based on the specific details and requirements of any given reactor geometry.

Figure 4:
FIG. 4: Sample Schematic designs for blowdown systems
Figure 4:
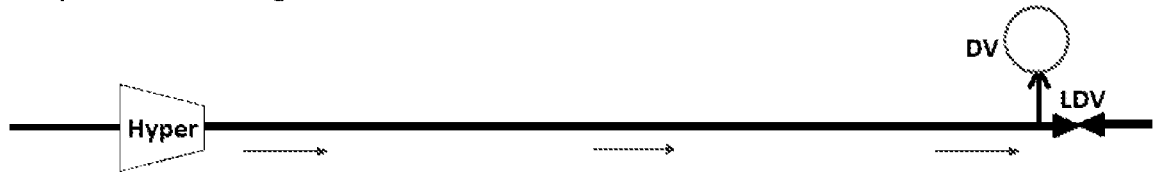
Figure 4:
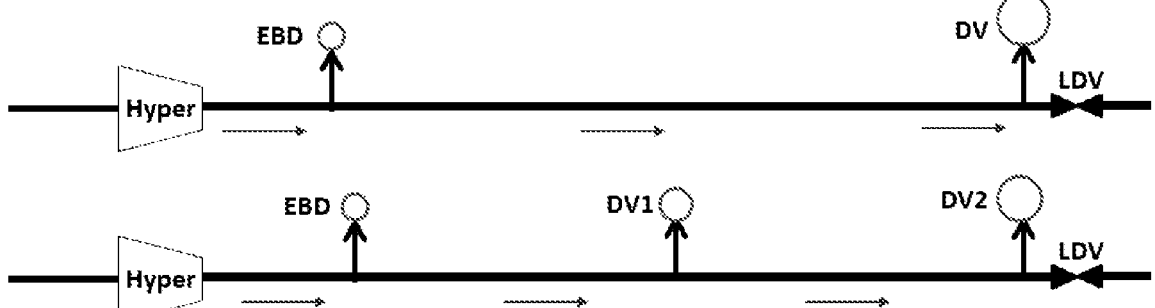

In some embodiments there is an additional valve between the front emergency valve and the valve at the end of the reactor. In another embodiment there is one additional valve with an ID of about 0.25-0.5 inches between the front emergency valve and the valve at the end of the reactor. The location and size of the additional valve is determined in a similar manner as the first two by including the optional third valve into the model disclosed herein above. The additional valve may be added to keep pressure and velocity fields within the ranges needed to maintain the tube wall temperatures below austenization temperatures. FIG. 4 shows some examples of the various embodiments.

In one embodiment the tubes of the reactor are low alloy carbon steel. In one embodiment tubes of the tube reactor are low alloy carbon steel having a carbon content of from about 0.3 to about 0.4% carbon. In one embodiment the tubes of the reactor are Grade AISI 4333 tubes.

In one embodiment the metal of the tube reactor has an austenization temperature between about 750° C. and about 850° C. In one embodiment the metal of the tube reactor has an austenization temperature of about 785° C. to about 793° C.

Figure 2:
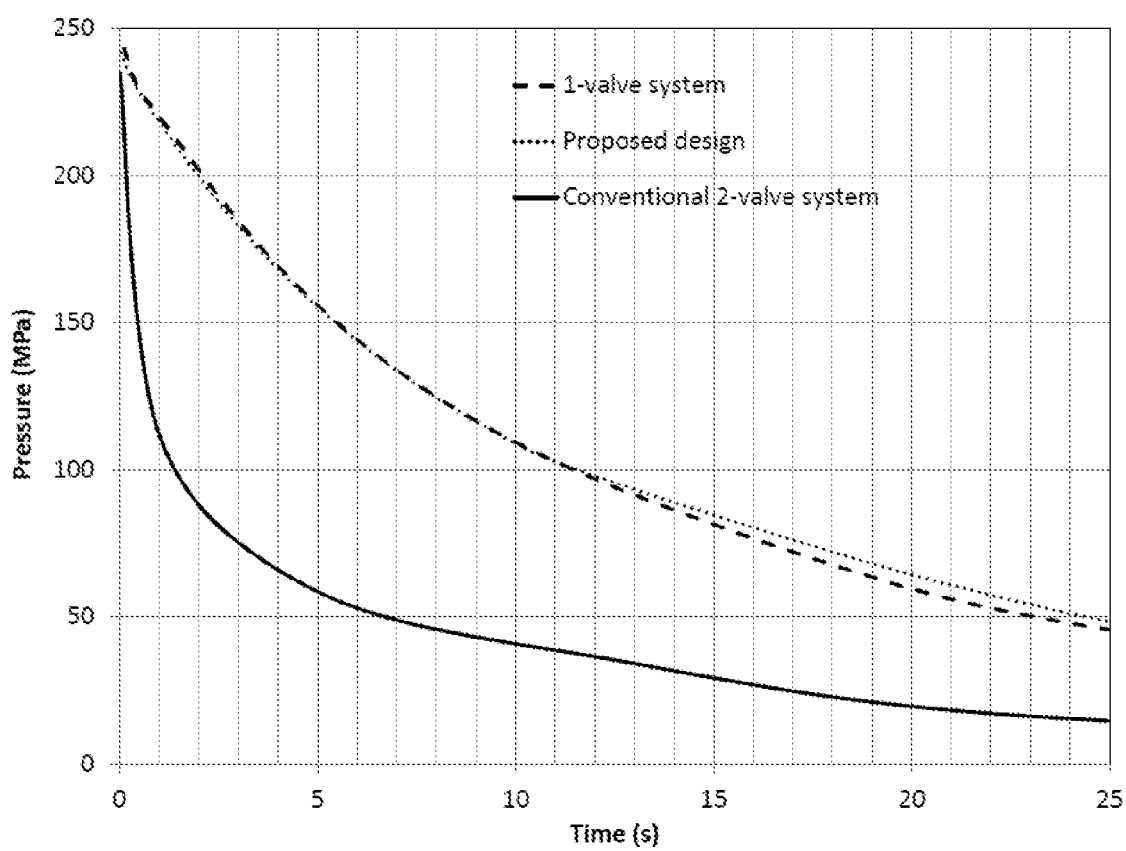
FIG. 2: Modeled depressurization curves at the first injection point from 250 MPa reactor pressure

The underlying objective of conventional 2-valve blowdown systems is to minimize the depressurization time at the front end of the reactor in the order of 1 second to 2 seconds, typically at the hyper discharge. Instead, in embodiments of this invention, the objective is to reduce the amount of heat being transferred to the tube wall during blowdown, while keeping the flow toward the blowdown valve unidirectionally. As a result, the proposed blowdown systems may have a longer depressurization time at the front end of the reactor compared to, for example, the conventional 2-valve design shown in FIG. 2. In addition, in some embodiments of the blowdown systems disclosed herein, no decomp would exit the front EBD, as the flow direction is maintained toward the reactor back end throughout the duration of the blowdown process. Furthermore, in some embodiments, no stagnation zone forms during the blowdown. Stagnation zones have been identified as a potential issue by other manufacturers who utilize 2-valve systems. Finally, in some embodiments, the target ethylene velocity during blowdown is between 40 ft/s to 80 ft/s (or 12 m/s to 25 m/s) while the current state-of-the-art blowdown system can promote much faster velocity, for example, greater than 150 ft/s (or greater than 45 m/s). Maintaining a lower velocity can be important during the early stages of the decomp event when the reactor pressure and decomp intensity is high.

Figure 5:
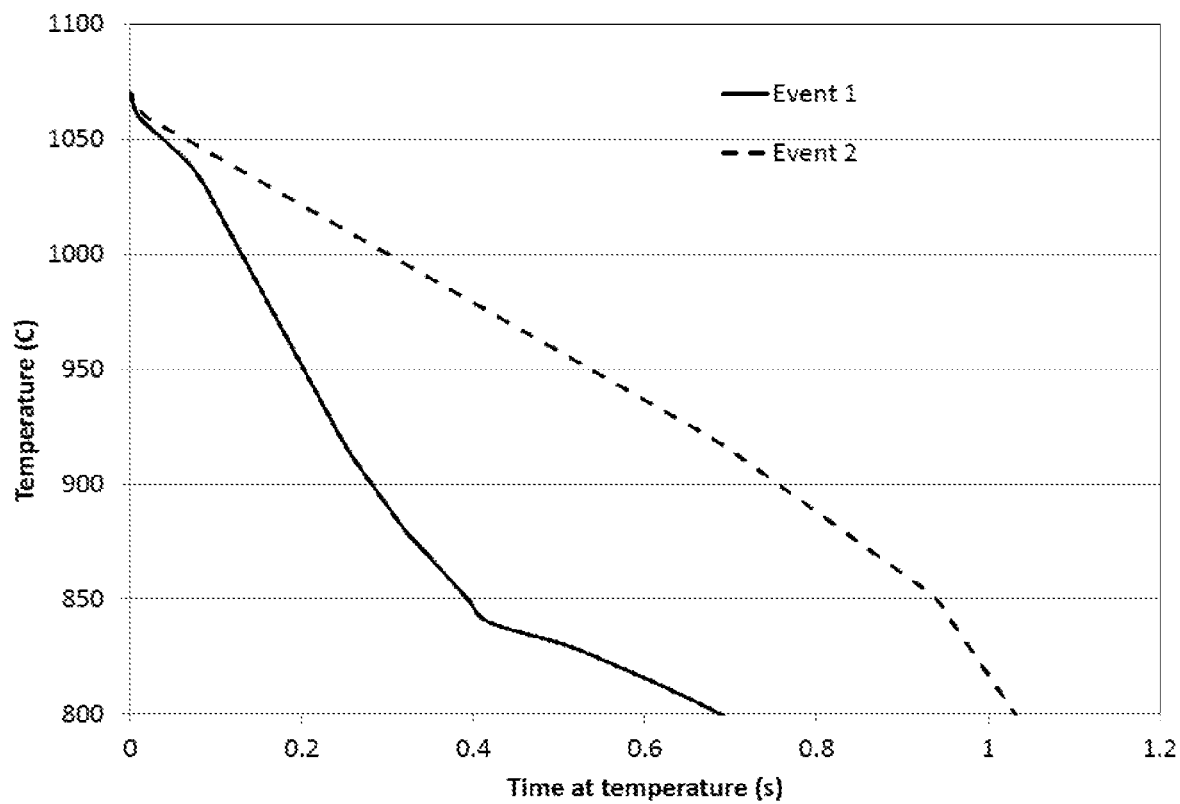
FIG. 5: Time during which a thermocouple measures a given temperature for two separate decomp events in a LDPE tubular reactor. Data acquisition rate for the above measurements is 0.18 s Low Density Polyethylene (LDPE) reactor tubes are typically made of low-alloy carbon steel, for example AISI 4333. Low-alloy carbon steel, when exposed to high temperatures like those experienced during a decomposition event (decomp), undergo microstructural transformations that compromise the mechanical properties of the reactor tubes, sometimes to such a great extent that the reactor tubes have to be replaced. Identification of compromised tubes and replacement procedures are time consuming and costly. The ultimate goal of an emergency blowdown system is to discharge the reacting material from the reactor in a controlled and safe manner without compromising the integrity of the reactor tubes and surrounding equipment along the way. The maximum metal temperature experienced by the reactor tubes during a decomp event is, therefore, an important parameter to monitor in determining the adequacy and effectiveness of the emergency blowdown system in place.

Without wishing to be bound by theory, it is believed that the dominant mechanism of heat transfer during a decomp is convection: the faster the flow velocity, the higher the convective heat transfer rate. FIG. 5 shows temperature data recorded at two different decomp events that actually occurred in a LDPE tubular reactor. The data is represented based on the time duration a thermocouple is measuring a specific temperature as a decomp wave is moving by. The reactor tube in Event 2 experienced hotter temperatures for notably longer periods of time than the tube in Event 1. Both tubes were removed after each event and destructive testing was performed to analyze its metallurgy. Martensite formation was found in the tube from Event 1 and not in the tube from Event 2. The fluid pressure at the two locations from the two events are the same, but the flow velocity in the tube examined for Event 2 is approximately half of that in the tube examined for Event 1. In this example, a velocity reduction by half has a significant impact on reducing the tube metal temperature for the same fluid pressure and fluid density. In fact, using the heat transfer coefficient formulation for turbulent pipe flow, it can be demonstrated theoretically that reducing velocity, rather than reducing the fluid pressure or the fluid density, has a higher impact on reducing the tube metal temperature.

In some embodiments of the blowdown systems disclosed herein the velocity field is less than 80 ft/s, or less than 60 ft/s, or less than 50 ft/s.

In some embodiments the optimal range of velocity within which the convective heat transfer rate is minimized while the hot materials are allowed to leave the reactor within a reasonable time period, for example is between 10 seconds to 100 seconds. In some embodiments the need for zoning logic, where a blowdown valve(s) is required to open then close during blowdown to accelerate the movement of hot materials out of the reactor in a preferable direction is eliminated. In some embodiments the blowdown system is uni-direction blowdown that does not require the closing of vent valves that are designed to fail open.

The depressurization at the first injection point for the embodiments disclosed herein are similar to that of a single-valve system in which a single vent valve is placed at the end of the reactor. In some state of the art systems, the single-valve blowdown system requires the hyper flow to be isolated at suction such that no ethylene can enter the reactor at the start of a decomp. In some embodiments of the invention disclosed herein flow isolation is not required. State of the art blowdown systems use a flow isolation method and hyper vendors teach the use of such systems. In some embodiments, an advantage of the blowdown systems disclosed herein versus the one-valve systems known in the art lies in the avoidance of isolating flow at the hyper suction, and instead venting the hyper flow via an adequately sized valve located in the reactor. In these instances the design allows for one-directional flow without causing complications in isolating the ethylene flow at either suction or discharge of the hyper that can potentially compromise any part of the hyper.

Figure 3:
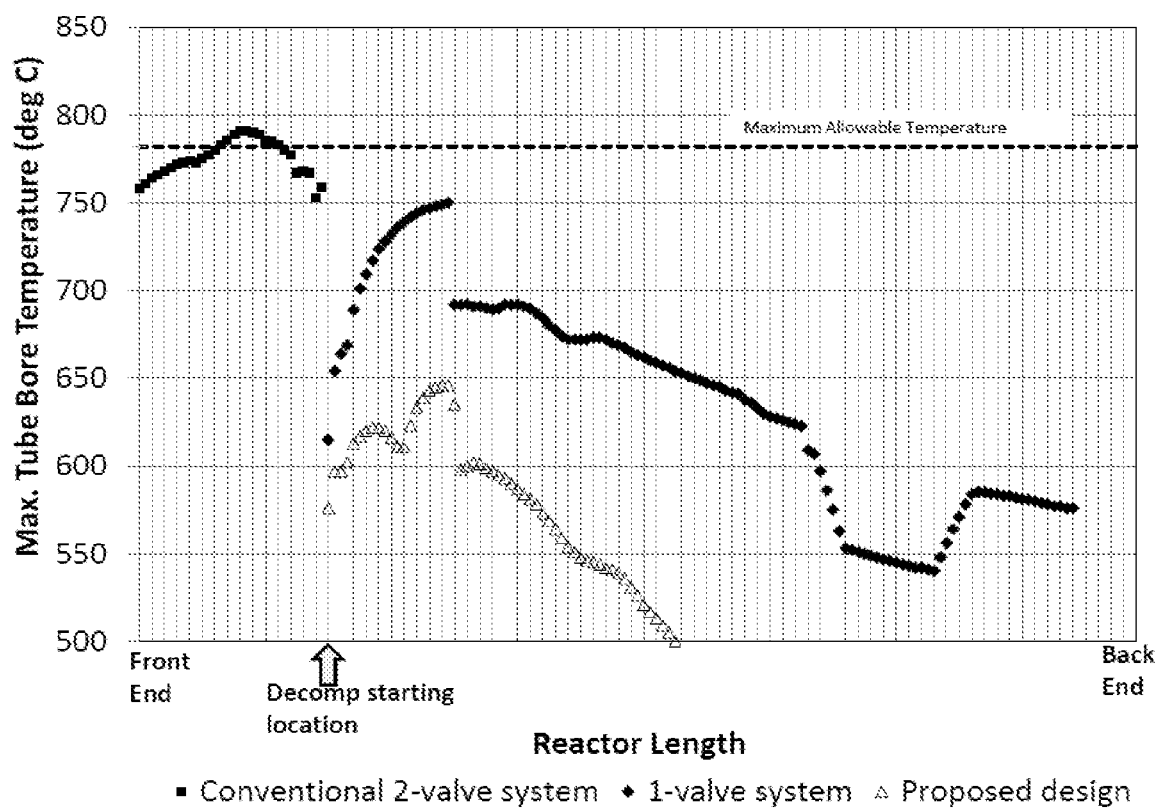
FIG. 3: Modeled reactor tube bore maximum temperature during a 250 MPa decomp blowdown event

FIG. 3 compares the tube bore temperature as the decomp exits the reactor for different blowdown systems. The conventional 2-valve system drives the decomp out through the front vent valve, while the other two systems take the decomp out through the back vent valve. The design made using the model and methods disclosed herein has improved performance over both conventional 2-valve and 1-valve systems. In some embodiments, the designs disclosed herein maintain specific pressure and velocity fields within the reactor during blowdown such that the amount of heat transfer to the tube wall is minimized for decomps occurring at any location within the reactor. This is an improvement on protecting the reactor tubes and the hyper over common practices by other LDPE manufacturers.

In some embodiments blowdown systems contemplated herein may also have a cold shot, or a side feed.

In addition, to increase safety and/or reliability reactors may have redundant valves: Multiple valves in similar locations designed to open only if the primary valve fails.

The present invention has been described with reference to certain details of particular embodiments thereof. It is not intended that such details be regarded as limitations upon the scope of the invention except insofar as and to the extent that they are included in the accompanying claims.

What is claimed is:

1. A unidirectional blowdown system for a high-pressure tubular reactor with a hypercompressor that minimizes a temperature of a tube wall metal during a decomposition event comprising:
   a front emergency blowdown valve located downstream from the hypercompressor and in a front end of the tubular reactor; and
   at least one additional valve at an end of the tubular reactor;
   wherein the system prevents the tubular reactor walls from reaching a temperature that causes the tube wall metal to austenize by maintaining flow in a single direction away from the hypercompressor during a blowdown, and by maintaining specific pressure and flow velocity within the tubular reactor during blowdown so that an amount of heat transfer to the tubular reactor walls is minimized.

2. The unidirectional blowdown system of claim 1 wherein an inner diameter (ID) of the front emergency blowdown valve is smaller than the at least one additional valve ID at the end of the tubular reactor.

3. The unidirectional blowdown system of claim 1 wherein the front emergency blowdown valve has an ID of from about 0.25 to about 0.5 inches.

4. The unidirectional blowdown system of claim 1 wherein the front emergency blowdown valve has an ID of from about 0.3 to about 0.4 inches.

5. The unidirectional blowdown system of claim 1 wherein the front emergency blowdown valve has an ID of 0.375 inches.

6. The unidirectional blowdown system of claim 1 wherein the at least one additional valve ID at the end of the tubular reactor is from about 0.375 to about 2 inches.

7. The unidirectional blowdown system of claim 1 wherein the at least one additional valve ID at the end of the tubular reactor is from about 1 to about 1.5 inches.

8. The unidirectional blowdown system of claim 1 wherein the at least one additional valve ID at the end of the tubular reactor is about 1 inch.

9. The unidirectional blowdown system of claim 1 wherein there is at least one additional valve between the front emergency blowdown valve and the at least one additional valve at the end of the tubular reactor.

10. The unidirectional blowdown system of claim 1 wherein there is one additional valve with an ID of about 0.25-0.5 inches between the front emergency blowdown valve and the at least one additional valve at the end of the tubular reactor.

11. The unidirectional blowdown system of claim 1 wherein the tubular reactor comprises at least one tube made from a low alloy carbon steel.

12. The unidirectional blowdown system of claim 1 wherein the tubular reactor comprises at least one tube made from a low alloy carbon steel having a carbon content of from about 0.3 to about 0.4% carbon.

13. The unidirectional blowdown system of claim 1 wherein the tubular reactor comprises at least one tube that is a Grade AISI 4333 tube.

14. The unidirectional blowdown system of claim 1 wherein the tube wall metal of the tubular reactor has an austenization temperature between about 750° C. and about 850° C.

15. The unidirectional blowdown system of claim 1 wherein the tube wall metal of the tubular reactor has an austenization temperature of about 785° C. to about 793° C.

16. The unidirectional blowdown system of claim 1 wherein the flow velocity is less than 80 ft/s.

17. The unidirectional blowdown system of claim 1 wherein the flow velocity is less than 60 ft/s.

18. The unidirectional blowdown system of claim 1 wherein the flow velocity is less than 50 ft/s.

19. A method for implementing a unidirectional blowdown of a decomposition event in a tubular reactor with a hypercompressor that minimizes a temperature of a tube wall metal during the decomposition event comprising:
   a. sensing the decomposition event;
   b. delivering automated signals to initiate an opening of a front emergency blowdown valve located downstream from the hypercompressor and an opening of at least one additional valve at an end of the tubular reactor;
   wherein the method prevents tubular reactor walls from reaching a temperature that causes the tube wall metal to austenize by maintaining flow in a single direction away from the hypercompressor during a blowdown, and by maintaining specific pressure and flow velocity within the tubular reactor during blowdown so that an amount of heat transfer to the tubular reactor walls is minimized.

20. The method of claim 19 wherein step a further comprises delivering an automated signal to shut down the hypercompressor.

21. The method of claim 19 wherein the flow velocity is less than 80 ft/s.

22. The method of claim 19 wherein the flow velocity is less than 60 ft/s.

23. The method of claim 19 wherein the flow velocity is less than 50 ft/s.

24. A method for designing a blowdown system for a tubular reactor comprising:
   a. determining an austenization temperature for a tube metal;
   b. optimizing the blowdown system based on a reduction of an amount of heat being transferred to a tube wall during blowdown to eliminate austenization of the tube metal during a decomposition event instead of optimizing the blowdown system to depressurize as quickly as possible.

25. The method of claim 24 wherein a method of determining the amount of heat being transferred to the tube wall during blowdown comprises:
   a. modeling a pressure and flow velocity inside the tubular reactor during blowdown using a dynamic model;
   b. simulating how a decomposition wave propagates within the tubular reactor during blowdown;
   c. determining a heat transfer coefficient as a function of pressure, temperature and velocity at any given location within the tubular reactor; and
   d. using temporal profiles of pressure, flow velocity, temperature, and heat transfer coefficient during blowdown to determine a tube wall temperature profile by solving a 1D transient heat equation using a finite-difference scheme.

* * * * *